Patented Feb. 20, 1923.

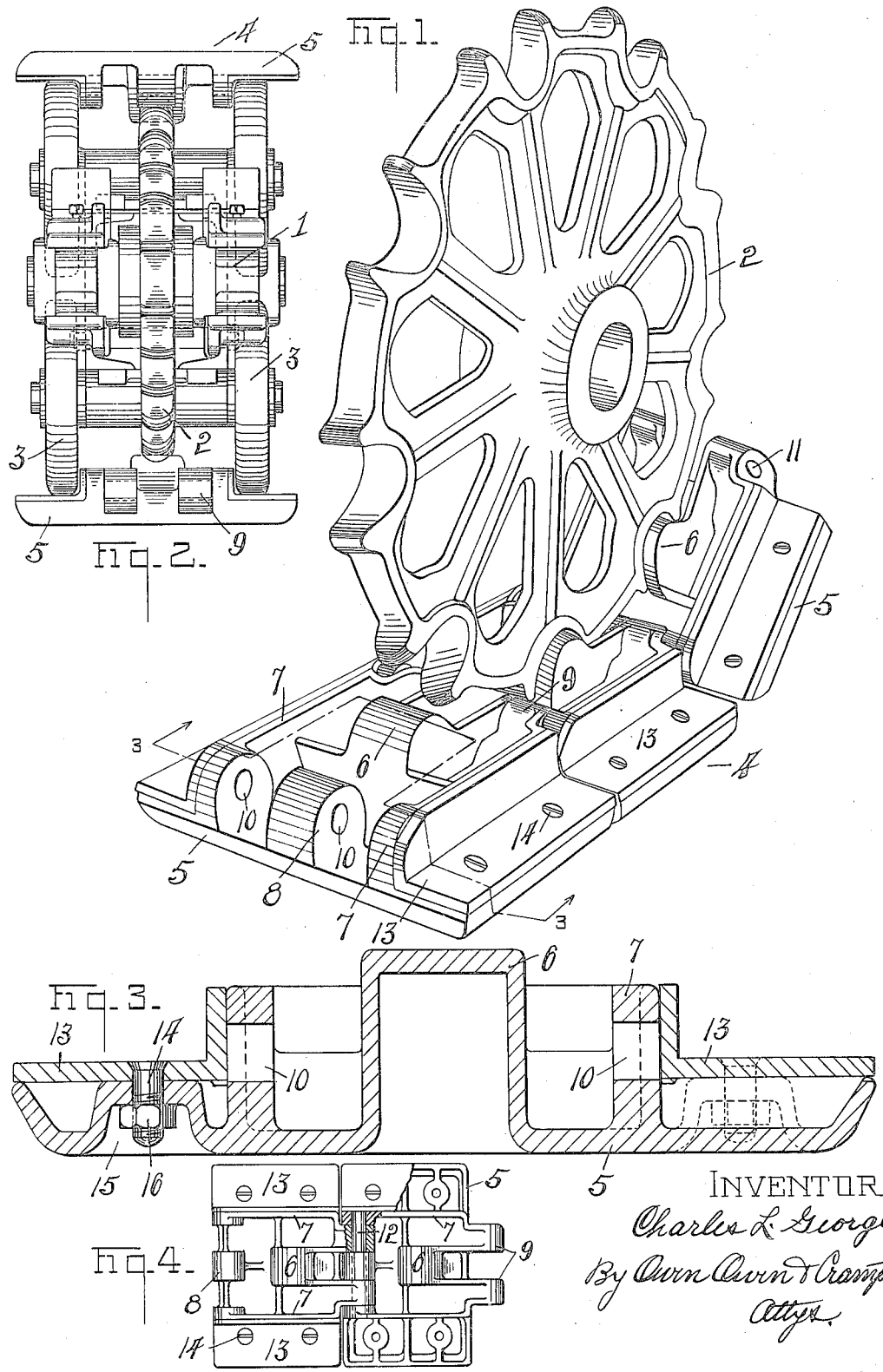

1,446,292

UNITED STATES PATENT OFFICE.

CHARLES L. GEORGE, OF FINDLAY, OHIO, ASSIGNOR TO THE BUCKEYE TRACTOR DITCHER COMPANY, OF FINDLAY, OHIO, A CORPORATION OF OHIO.

TREAD BELT FOR APRON WHEELS.

Application filed March 20, 1922. Serial No. 545,000.

*To all whom it may concern:*

Be it known that I, CHARLES L. GEORGE, a citizen of the United States, and a resident of Toledo, in the county of Lucas and State of Ohio, have made an Invention appertaining to a Tread Belt for Apron Wheels; and I do hereby declare the following to be a full, clear, and exact description of the invention, such as will enable others skilled in the art to which it appertains to make and use the same, reference being had to the accompanying drawing, and to the characters of reference marked thereon, which form a part of this specification.

This invention relates to apron wheels, and particularly to the apron or belt construction thereof, and has for its object the provision in a belt of this character of a strong, durable and efficient link having detachable wear plates for receiving the peripheral and side wearing coaction of the pressure rollers of the associated truck, and which plates also serve to secure the connecting journal pins of the belt against removal.

Further objects and advantages of the invention will be apparent from the following detailed description thereof.

While the invention, in its broader aspect, is capable of embodiment in numerous forms, a preferred embodiment thereof is illustrated in the accompanying drawings, in which,—

Fig. 1 is a perspective view of a portion of a belt embodying the invention with a sprocket wheel in engagement therewith. Fig. 2 is an outer end elevation of an apron wheel frame equipped with an apron or tread belt embodying the invention, with a portion of the links thereof removed. Fig. 3 is an enlarged irregular cross section of a belt link embodying the invention, taken on the line 3—3 in Fig. 1, and Fig. 4 is a reduced top plan view of a pair of connected links with parts broken away and parts removed.

Referring to the drawings, 1 designates an apron wheel frame having a single sprocket wheel 2 (one only being shown) at each end and a plurality of pairs of pressure wheels 3 intermediate the sprocket wheels for exerting an outward pressure particularly on the lower run of the tread belt 4 intermediate its points of engagement with the sprocket wheels 2, as well understood in the art.

The tread belt 4 comprises a plurality of pivotally connected links 5 preferably of cast steel construction, and each having a single sprocket wheel engaging tooth 6 disposed substantially centrally of its ends and sides. Each link is provided at opposite sides of its tooth 6 and in inwardly spaced parallel relation to its respective side edge with an upstanding longitudinally extending flange 7.

Between the flanges 7 at one end of the link is provided an upstanding bearing lug 8 disposed within the confines of the link, and at the other end of the link between the flanges 7, is disposed a pair of transversely spaced bearing lugs 9, which project lengthwise from the adjacent end of the associated link and fit into the spaces provided between the lug 8 and side flanges 7 of an adjoining link. The lug 8 and the end portions of the flanges 7 disposed at opposite sides thereof are provided entirely therethrough with axially aligned journal pin receiving apertures 10, and the lugs 9 are provided transversely thereof with similar apertures 11 adapted to register with the apertures 10 of an adjoining link when two links are in assembled position. A journal pin 12 is inserted through the apertures 10 and 11 of adjoining links to connect the same together, the pins bearing at their outer ends in the apertured end portions of the flanges 7. When a pair of connected links are disposed in straight longitudinal alignment, their ends are substantially in abutment so that they cooperate to form a substantially continuous tread surface with practically no space or opening therebetween.

The portions of the links 5 which are disposed without the flanges 7 and are in longitudinal alignment with like portions of successive links, are intended to form longitudinally extending tracks for the pressure rolls 3, the rolls of each pair being disposed in position to engage the track portions of a link at opposite side edges thereof.

In the use of tread belts of this character it is found that the pressure rolls 3 not only coact peripherally with the track forming surfaces of the links and occasion wear thereon, but also coact at their inner side edges with the flanges 7 disposed at the inner sides of the tracks and occasion a very considerable wear on such flanges due to transverse wrenching or twisting movements of the tread belt sections particularly when the associated machine is being turned about one apron wheel as a pivot. In order to prevent such wear on a link structure and to cause it to take place on easily replaceable parts, I provide each track portion of a link with a removable angle-iron plate 13, one flange of which seats on and covers the associated track portion of the link while the other flange extends up and covers the outer side of the adjacent flange 7 as shown. These wear plates are secured to a link by bolts 14, which preferably have their heads countersunk in the top surfaces of the tread portions of the plates and their shanks projected down through the plates and a registering portion of the links and terminating in registering sockets or recesses 15 provided in the bottom or tread surfaces of the links and adapted to receive the bolt nuts 16.

The angle-plates 13 in addition to serving as wear plates for coaction with the pressure wheels 3 of a wheel frame also have their vertical or upright flanges covering the outer ends of the journal pin receiving apertures 10 in the link flanges 7 so as to retain a journal pin 12 in link connecting position. This manner of securing the journal pins in position is of material advantage in that it permits the journal in the joints of the tread links to turn freely in the bearings of either link connected thereby which offers the least resistance to a turning action.

It is evident that I have provided a simple and efficient tread belt construction, the joints of which are connected and interlocked in a manner to protect the journals from dirt which may squeeze through between the tread links, and that the pressure wheel track portions thereof are provided with removable angle-iron wear plates for the pressure rolls, which plates have side flanges to guide the rollers and are backed by ribs or flanges 7 on the links to prevent them from being broken down by the side wrenching or twisting thrust of the pressure rollers occasioned more particularly during a truck turning action. The track plates also act as journal pin securing means.

I wish it understood that my invention is not limited to any specific construction, arrangement or form of the parts, as it is capable of embodiment in numerous forms without departing from the spirit of the claims.

Having thus described my invention, what I claim as new, and desire to secure by Letters Patent, is,—

An apron wheel link having a longitudinally extending track portion at each side edge of its inner side, a flange extending upward from the inner side of each track portion and coextensive in length with the length of the link, and tooth members disposed between the flanges, each track portion being of hollow form with its inner side open and having lugs projecting upward therein in countersunk relation to the outer surfaces of the links, angled wear plates mounted over the hollow track portions of the link and supported by the outer edges of such portions and by the inwardly projecting lugs, one flange of each plate extending outward from the track portion in protecting relation to the respective flange of the link, and bolts projecting through the plates and lug portions of the links to secure the parts in rigid relation.

In testimony whereof, I have hereunto signed my name to this specification.

CHARLES L. GEORGE.